United States Patent
Baker et al.

(10) Patent No.: US 12,362,933 B2
(45) Date of Patent: *Jul. 15, 2025

(54) SCHEME FOR TRANSFERRING AND AUTHENTICATING DATA

(71) Applicant: Apple Inc., Cupertino, CA (US)

(72) Inventors: Paul A. Baker, Santa Clara, CA (US); Michael W. Murphy, Menlo Park, CA (US); Mark P. Colosky, Sunnyvale, CA (US); James E. Zmuda, Santa Clara, CA (US); Jangwon Lee, Santa Clara, CA (US); Kevin C. Gotze, Hillsboro, OR (US); Peter Louis Bielawski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,151

(22) Filed: May 21, 2024

(65) Prior Publication Data
US 2024/0396731 A1    Nov. 28, 2024

Related U.S. Application Data

(63) Continuation of application No. 17/374,456, filed on Jul. 13, 2021, now Pat. No. 12,015,710.

(51) Int. Cl.
*H04L 9/32* (2006.01)
(52) U.S. Cl.
CPC ..................... *H04L 9/32* (2013.01)
(58) Field of Classification Search
CPC ... H04L 9/32; H04L 2209/805; H04L 9/3242; H04L 9/0643
See application file for complete search history.

(56) References Cited

U.S. PATENT DOCUMENTS

| | | |
|---|---|---|
| 7,743,239 B2 | 6/2010 | Ahlquist |
| 10,243,744 B2 | 3/2019 | Alomair |
| (Continued) | | |

OTHER PUBLICATIONS

CaCAN—Centralized Authentication System in CAN (Controller Area Network) Ryo Kurachi, Yutaka Matsubara, Hiroaki Takada Graduate School of Information Science Naogya University Email: kurachi@nces.is.nagoya-u.ac.jp, {yutaka, hiro}@ertl.jp Naoki Adachi, Yukihiro Miyashita, Satoshi Horihata AutoNetworks Technologies, Ltd. Email: {adachi-naoki, miyashita-yukihiro, horihata}@sei.co.jp, 10 pages, Nov. 2014.

(Continued)

*Primary Examiner* — Abiy Getachew
(74) *Attorney, Agent, or Firm* — Kowert, Hood, Munyon, Rankin & Goetzel, P.C.; Gareth M. Sampson; Dean M. Munyon

(57) ABSTRACT

Various techniques related to authenticating and verifying the integrity of data received by a computer system from an external source (such as a sensor) are disclosed. Hardware circuits are disclosed that, along with the computer processor, allow for error-checking and authentication of data received by the computer system. For instance, the hardware circuits may generate a separate authentication code that can be compared to the authentication code in the data itself to determine whether or not the message is authentic and whether or not there is an error in the data. The disclosed techniques reduce the processing requirements of a computer system and can be implemented using simple hardware circuit designs.

20 Claims, 6 Drawing Sheets

(56) References Cited

U.S. PATENT DOCUMENTS

| | | | | |
|---|---|---|---|---|
| 2016/0095053 A1* | 3/2016 | Johansson | ............ | H04W 12/08 |
| | | | | 455/411 |
| 2018/0309580 A1* | 10/2018 | Jeon | ............ | H04L 9/0643 |
| 2020/0336300 A1 | 10/2020 | Delhoste et al. | | |
| 2020/0336600 A1* | 10/2020 | Jackson | ............ | H04M 7/006 |
| 2022/0271941 A1* | 8/2022 | Ramasamy Muthusamy | ............ | |
| | | | | H04L 9/3234 |

OTHER PUBLICATIONS

Harba: Secure Data Encryption Through a Combination of AES, RSA and HMAC Secure Data Encryption Through a Combination of AES, RSA and HMAC, Eman Salim Ibrahim Harba Computer Unit and Internet College of Arts, University of Baghdad Baghdad, Iraq emanharba_121212@coart.uobaghdad.edu.iq Engineering, Technology & Applied Science Research vol. 7, No. 4, 2017, 1781-1785 1781 www.etasr.com, 5 pages.

Message Authentication using Hash Functions—The HMAC Construction, Mihir Bellar, Ran Canettiy, Hugo Krawczykz, Appears in RSA Laboratories' CryptoBytes, vol. 2, No. 1, Spring 1996.

* cited by examiner

500

```
┌─────────────────────────────────────────────────────────┐
│ Receiving, at a computer system, a message from a       │
│ source external to the computer system, the message     │
│ having data and a first message authentication code,    │
│ where the first message authentication code is          │
│ generated at the external source from the data          │
│                         502                             │
└─────────────────────────────────────────────────────────┘
                            │
                            ▼
┌─────────────────────────────────────────────────────────┐
│ Storing, in a memory system of the computer system,     │
│ the message                                             │
│                         504                             │
└─────────────────────────────────────────────────────────┘
                            │
                            ▼
┌─────────────────────────────────────────────────────────┐
│ Retrieving, by a hardware circuit in the computer       │
│ system, the data in the message from the memory system  │
│                         506                             │
└─────────────────────────────────────────────────────────┘
                            │
                            ▼
┌─────────────────────────────────────────────────────────┐
│ Generating, at the hardware circuit, a second message   │
│ authentication code from the data in the message        │
│ retrieved from the memory system                        │
│                         508                             │
└─────────────────────────────────────────────────────────┘
                            │
                            ▼
┌─────────────────────────────────────────────────────────┐
│ Transmitting, by the hardware circuit, the second       │
│ message authentication code to a processor circuit in   │
│ the computer system                                     │
│                         510                             │
└─────────────────────────────────────────────────────────┘
                            │
                            ▼
┌─────────────────────────────────────────────────────────┐
│ Determining, by the processor circuit, whether or not   │
│ the message is authentic and whether or not there is    │
│ an error in the data based on a comparison of the       │
│ second message authentication code to the first         │
│ message authentication code                             │
│                         512                             │
└─────────────────────────────────────────────────────────┘
```

FIG. 5

SCHEME FOR TRANSFERRING AND AUTHENTICATING DATA

The present application claims priority to U.S. application Ser. No. 17/374,456, entitled "Scheme for Transferring and Authenticating Data," filed Jul. 13, 2021, the disclosure of which is incorporated by reference herein in its entirety.

BACKGROUND

Technical Field

Embodiments described herein are related to the transfer of data from an external source to a computer system, and more particularly to ensuring the data is authentic and error-free.

Description of the Related Art

Many different systems that have on-board computers (such as robotic systems, process control systems, communications systems such as mobile phone systems that connect mobile phones, utility systems, infrastructure systems, automobiles, airplanes, trains, etc.) rely on receiving data from external sources such as sensors to make determinations about operations of the systems. In some instances, the data being received from external sources is data relevant to the operation of the systems. For example, a system may need data from an external source to determine whether the system is operating as intended. Accordingly, there is a need to ensure the data received by the system is authentic and has no errors. Additionally, there is need to verify that the received data was transmitted by the expected external source.

BRIEF DESCRIPTION OF THE DRAWINGS

The following detailed description refers to the accompanying drawings, which are now briefly described.

FIG. 5 is a flow diagram illustrating a method for authenticating a message, according to some embodiments.

Figure 1:
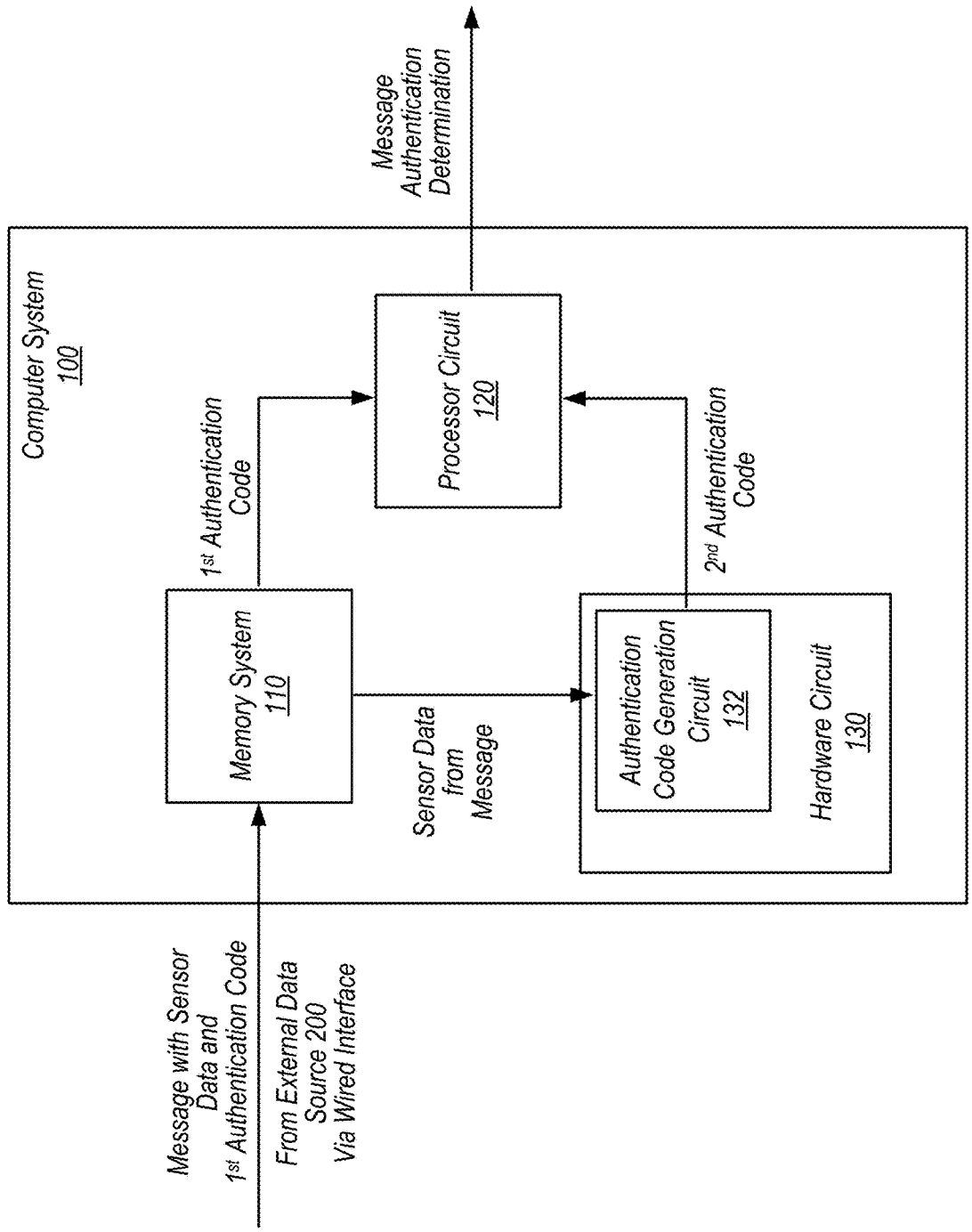
FIG. 1 is a block diagram of a computer system, according to some embodiments.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

The present disclosure is directed to various techniques related to ensuring the integrity of data received by a computer system from an external source (such as a sensor). In many systems, data being received by a computer system from an external source is important to operation of the overall system. Examples of systems that may have data transmitted from external sources to a computer system include, but are not limited to, robotic systems, process control systems, manufacturing systems, utility systems, infrastructure systems, automobiles, airplanes, and trains. In order for the data to be used in such systems, the integrity and authenticity of the data needs to be ensured. Ensuring the integrity of the data may include determining that the data received by the computer system is error-free and that the data has been received from a known (e.g., authentic or verified) source.

In some implementations, determining that the data is error-free includes determining that the data received by the computer system matches the data sent by an external source. Such error checking may be referred to as end-to-end error checking where data is created at one end of a communication medium and checked at the other end. One example of a current implementation for end-to-end error checking is a CRC (cyclic redundancy check). A CRC process is handled by the centralized computer system after receiving data. Implementing a CRC process in the computer system may, however, be complex and process intensive. Additionally, CRC processes are primarily used to detect accidental changes in data as CRC processes cannot provide any authentication (or verification) information about the received data. For instance, a CRC process is not able to provide any information about the authenticity of the external source that transmitted the data.

For authentication implementations, the computer system may be tasked to verify that the data received has been sent by an authentic external source (e.g., an authentic sensor) in addition to error checking the data. The verification may be implemented to ensure the data is not from an external source that is unknown to the computer system (such as an attacker). In some current contemplations, a cryptographic message authentication scheme is implemented between the computer system and an authentic external source for verification of the data. The cryptographic message authentication scheme may be implemented so that the computer system is able to verify that the data has been transmitted from an authentic external source. In many instances, however, cryptographic checking, in addition to error checking, may require examination of every bit of data received by the centralized computer system, which is time consuming and process intensive.

An alternative implementation for error checking and/or authentication checking may include implementing the error checking or authentication checking inside a hardware block (circuit) located in the computer system. If a hardware block is used for error checking or authentication checking, however, the hardware block itself also has to be analyzed for authentication considerations, which may make the design of the hardware block more complex. Additionally, the hardware block still has to provide the data to a computer processor (e.g., processor circuit) and thus the hardware block does not check at the end point for the data. Accordingly, the computer processor may have to make additional determinations about the data transmitted from the hardware block in order to ensure the integrity of the data. The present disclosure contemplates various techniques that reduce the processing requirements of the computer system and can be implemented in simple hardware circuit designs in order to ensure that data received by a computer system is error-free and from an authentic source.

FIG. 1 is a block diagram of a computer system 100, according to some embodiments. In the illustrated embodiment, computer system 100 includes memory system 110, processor circuit 120, and hardware circuit 130. In certain embodiments, computer system receives a message with data and an authentication code (e.g., first authentication code) and makes a determination of whether or not the data is error-free and if the authentication code confirms that the message has been sent by an authentic source.

In various embodiments, computer system 100 is a centralized computer system (e.g., a primary control system) that is part of a larger system environment. For instance, computer system 100 may be a centralized computer system that utilizes data from external sources to determine control parameters or other operational parameters for the overall system. As one example, computer system 100 may be a control system for a robotic manufacturing system where the computer system is responsible for monitoring and controlling operations being implemented by the robots. In some embodiments, computer system 100 includes a system on a chip (SoC) where one or more of memory system 110, processor circuit 120, and hardware circuit 130 are located on the chip. For example, one contemplated embodiment may have memory system 110 and processor circuit 120 on an SoC while hardware circuit 130 is positioned on another chip.

Figure 2:
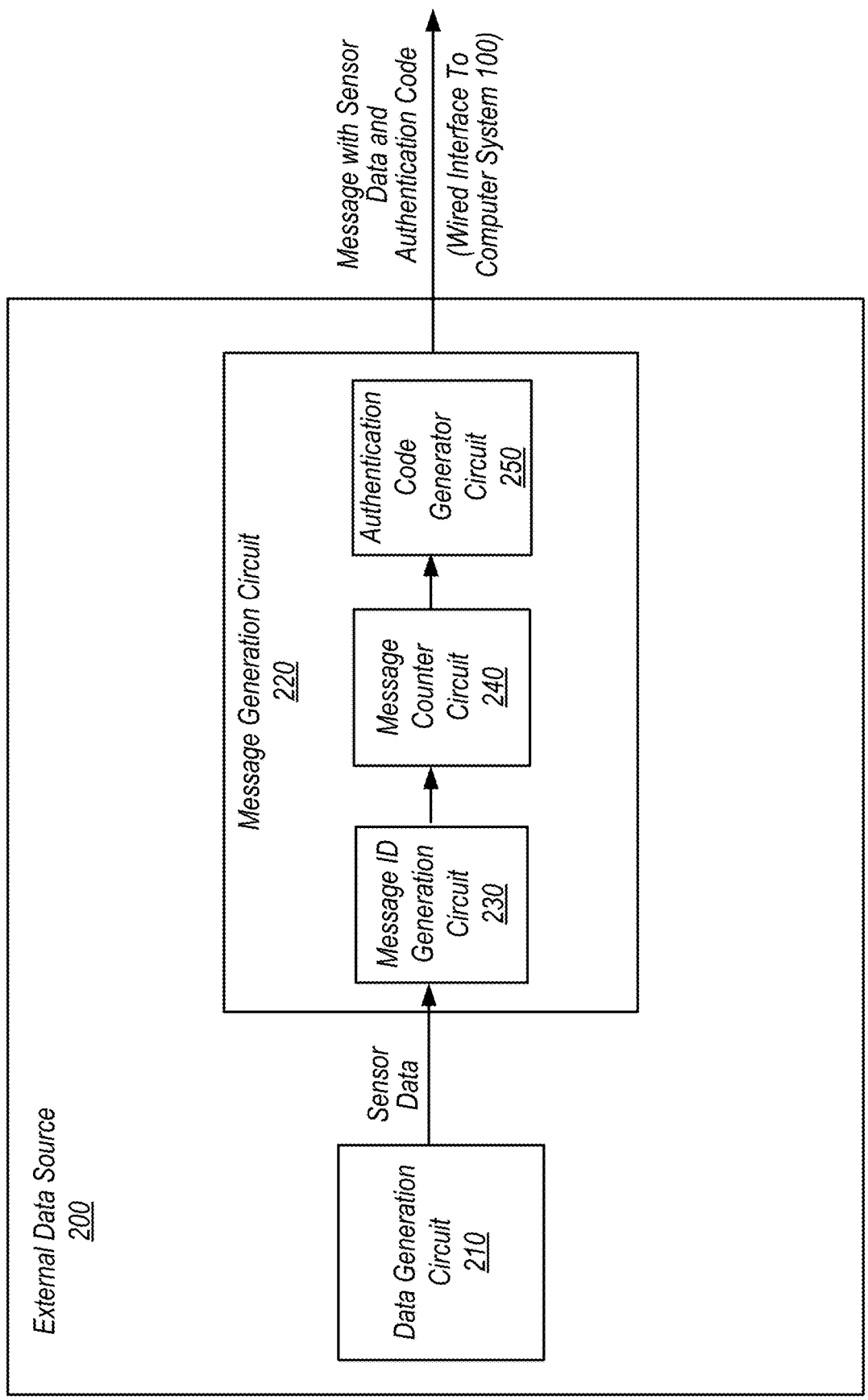
FIG. 2 is a block diagram of an external data source, according to some embodiments.

In certain embodiments, computer system 100 receives the message with sensor data from external data source 200. FIG. 2 is a block diagram of external data source 200, according to some embodiments. External data source 200 may be any module, circuit, or component that generates or collects data. For example, external data source 200 may be a sensor, a camera, another computer system, or combinations thereof. As used herein, the term "sensor data" refers to any data generated or collected by external data source 200. In various embodiments, external data source 200 may be capable of at least some processing of sensor data. For instance, external data source 200 may process data to reduce the amount of sensor data transmitted to computer system 100. In various embodiments, external data source 200 may be capable of at least some processing of sensor data. For instance, external data source 200 may process data to reduce the amount of sensor data transmitted to computer system 100.

In the illustrated embodiment, external data source 200 includes data generation circuit 210 and message generation circuit 220. Data generation circuit 210 may generate or collect sensor data. In some embodiments, data generation circuit 210 may implement at least some processing of the sensor data (e.g., to reduce the amount of data). In the illustrated embodiment, data generation circuit 210 provides the sensor data to message generation circuit 220. In certain embodiments, message generation circuit 220 generates a message that is provided (e.g., transmitted) to computer system 100 where the message includes the sensor data. In some embodiments, message generation circuit 220 processes the sensor data, at least in part, in generating the message.

In various embodiments, message generation circuit 220 includes message ID generation circuit 230. Message ID generation circuit 230 may generate a message identifier (e.g., message ID) that is added to the message in message generation circuit 220. The message identifier may include, for example, a value that describes external data source 200. In various embodiments, the message identifier is assigned to external data source 200 when the external data source is designed or manufactured. Accordingly, the message identifier may be added to the message for identification of external data source 200 by computer system 100, as described herein.

In certain embodiments, message generation circuit 220 includes message counter circuit 240. Message counter circuit 240 may add a message counter value to the message that increases in every instance that a message with sensor data is generated and sent. For instance, the message counter value may begin with 1 for a first message generated and sent by external data source 200 and increase integrally with each successive message (e.g., 2, 3, 4, etc.). Adding the message counter value to the message may provide an indicator (e.g., to computer system 100) that new sensor data is being sent by external data source 200.

In certain embodiments, message generation circuit 220 includes authentication code generator circuit 250. Authentication code generator circuit 250 may add an authentication code to the message. The authentication code may be added to the message to allow downstream verification (e.g., by computer system 100) of the integrity of sensor data and authenticity of the message. In various embodiments, the authentication code is an HMAC (hash-based message authentication code). Other types of message authentication codes may also be contemplated. In some embodiments, authentication code generator circuit 250 implements a scheme such as SHA-256 or AES-GCM to generate the authentication code added to the message.

In certain embodiments, authentication code generator circuit 250 generates the authentication code from the sensor data in the message (e.g., the data generated by data generation circuit 210). Authentication code generator circuit 250 may also generate the authentication code from the sensor data in the message in combination with either one or both of the message identifier and the message counter value. As described herein, any change in the sensor data after the message is sent by external data source 200 may be detected by implementation of the authentication code. For example, since the authentication code is generated based on the sensor data in the message, a change in the sensor data after the message is sent by external data source 200 will cause a message authentication code determined from the sensor data at a downstream system (e.g., computer system 100) to not match the authentication code included in the message (e.g., the authentication code generated by authentication code generator circuit 250).

After the authentication code is added to the message, the message may be transmitted (sent) by external data source 200 to computer system 100. In certain embodiments, external data source 200 transmits the message as a message stream (e.g., data stream). For a message stream, external data source 200 transmits the message with the sensor data as the sensor data is generated in the external data source (e.g., the sensor data is transmitted as it is generated and there is no sensor data stored in the external data source). Transmitting the message as a message stream allows external data source 200 to send the sensor data without needing to wait for all the sensor data to be available and may eliminate the need for significant memory storage in the external data source. In embodiments using a message stream, authentication code generator circuit 250 may generate the message authentication code as the data streams through the authentication code generator circuit 250. Thus, authentication code generator circuit 250 can generate the authentication code as the data is streamed, producing the final authentication code when all the data has been streamed and overlapping the time to generate the authentication code with the time required to stream the data.

Alternative embodiments may be contemplated, however, where external data source 200 includes memory storage and all the sensor data for a message is collected in the external data source before the message is transmitted. In such embodiments, authentication code generator circuit 250 may generate the message authentication code after all the sensor data for the message is collected.

Turning back to FIG. 1, in the illustrated embodiment, the message with sensor data and the authentication code is received by computer system 100 from external data source 200. In certain embodiments, the message is transmitted to computer system 100 via a wired interface between the computer system and external data source 200. Embodiments with wireless interfaces and combinations of wired and wireless interfaces, however, may also be contemplated. Generally, the interface between the external data source 200 and the computer system 100 may be any arbitrary size, level of complexity, and/or hierarchy, etc.

In the illustrated embodiment, the message is stored by memory system 110. For instance, the sensor data along with the message identifier and/or message counter value may be stored in memory system 110. In certain embodiments, memory system 110 receives the message without any processing of the sensor data or other information in the message. Accordingly, the message stored in memory system 110 is a simple (direct) representation of the message received by computer system 100. In some embodiments, the message may pass through one or more elements of computer system 100 before being stored in memory system 110 while the message remains unprocessed before reaching the memory system. For instance, as described for the embodiment of FIG. 3 below, the message may be received by hardware circuit 130 and passed through to memory system 110 without any processing of the message by the hardware circuit.

In some embodiments, processor circuit 120 may access the message identifier and/or message counter value when the message stored in memory system 110 includes either of these pieces of data. Processor circuit 120 may access the message identifier to determine whether the sensor data is from an authentic sensor (e.g., external data source 200 is authentic) or the sensor data is from the expected source. Processor circuit 120 may access the message counter value to verify that the message sent by external data source 200 is unique and not a repeat of another message. For example, as described above, the message counter value may be an integral number that increases with each successive message sent by external data source 200. Thus, processor circuit 120 may verify that each message sent by external data source 200 is unique by assessing the message counter value since each message sent by the external data source should have a new message counter value. As an example, if there is no change in the data generated between a first message and a second message, the data in the first message will be identical to the data in the second message. The message counter value, however, may be different (e.g., the value changes from 1 to 2). Accordingly, a determination can be made that even though the data in the message is the same, that a new message has been sent and received (e.g., by computer system 100). Making the determination of the uniqueness of the message based on the message counter value may assist in detecting attacks by systems attempting to mimic or repeat message data.

In various embodiments, hardware circuit 130 retrieves the sensor data from the memory system 110. In embodiments using a message stream, hardware circuit 130 may begin retrieving the sensor data while the message is still streaming into memory system 110. In certain embodiments, authentication code generation circuit 132 in hardware circuit 130 generates an authentication code (e.g., the second authentication code) from the sensor data retrieved from memory system 110. In embodiments where the message includes a message identifier and/or a message counter value, authentication code generation circuit 132 may generate the authentication code from the sensor data along with the message identifier and/or the message counter value. The authentication code generated by authentication code generation circuit 132 is generated without any knowledge of the authentication code received and stored in memory system 110 (e.g., the first authentication code).

In certain embodiments, authentication code generation circuit 132 implements the same authentication code generation scheme (e.g., SHA-256 or AES-GCM) as implemented by authentication code generator circuit 250 in external data source 200. The scheme may be agreed on between computer system 100 and external data source 200 through a key generation agreement or other encryption agreement between them. Various embodiments known in the art may be contemplated to establish a key generation agreement or other encryption agreement between computer system 100 and external data source 200 such that authentication code generation circuit 132 and authentication code generation circuit 250 implement the same authentication code generation scheme. In an embodiment, a particular encryption scheme may be selected by the designer of the system and the hardware may be configured to implement the selected scheme.

The second authentication code may be a local authentication code for computer system 100 whereas the first authentication code (e.g., the authentication code received and stored in memory system 110) has been generated externally by external data source 200. It should be noted that authentication code generation circuit 132 may generate the second authentication code as the sensor data (and the message identifier and/or the message counter value) is being retrieved by hardware circuit 130 from memory system 110. Thus, the second authentication code may be generated while the message stream is being received by computer system 100. In various embodiments, the second authentication code is completed when the entirety of the message is received by computer system 100 (e.g., the message transmission by external data source 200 is complete).

After the second authentication code is completed by authentication code generation circuit 132, the second authentication code may be accessed by processor circuit 120. Processor circuit 120 may further access the first authentication code from memory system 110 and implement a comparison between the two authentication codes. Processor circuit 120 may determine an authenticity of the message received by computer system 100 (e.g., the message with the first authentication code) based on the comparison between the first authentication code and the second authentication code. For example, if the first authentication code and the second authentication code match, then the sensor data received in the message is error-free and the message is authentic and received from an authorized external data source since the second authentication code has been generated from the unprocessed sensor data (and the message identifier and/or the message counter value) as received in memory system 110. Accordingly, with a match in the authentication codes, processor circuit 120 determines that no errors or faults were introduced in the sensor data from transmission by external data source 200 (e.g., via the wired interface) and/or in the process of storing the message in memory system 110. After processor circuit 120 makes a determination that the sensor data is error-free and authentic, the sensor data may be further processed (e.g., analyzed) by the processor circuit or another processor in computer system 100.

A mismatch between the first authentication code and the second authentication code match may indicate that either external data source 200 is not authentic (e.g., the external data source is a counterfeit or unknown sensor) or that an error or fault was introduced to the sensor data after being transmitted by the external data source. Since the authentication codes are generated from the sensor data itself, the authentication codes may not match if even a single bit of sensor data has changed between the generation of the first authentication code and the generation of the second authentication code. Accordingly, a non-match between the authentication codes may indicate there was an error or fault in the data introduced between the generation of the first authentication code and the storage of the message in memory system 110. The non-match may potentially also be an indication that an error or fault was introduced in either the interface between memory system 110 and hardware circuit 130 or the interface between processor circuit 120 and hardware circuit 130, though the introduction of errors or faults in these interfaces is less likely than the interface between external data source 200 and memory system 110.

In certain embodiments, computer system 100 discards or ignores the sensor data (and the message itself) in response to determining that there is a mismatch between the authentication codes. For instance, sensor data may be discarded or ignored when external data source 200 is a sensor as the message rate of sensor data is high and computer system 100 will receive another message with sensor data in a short time period. In some embodiments, multiple messages with errors in the sensor data may indicate that there is a failure in the overall framework of computer system 100 and external data source 200 or a part of the overall framework is being subjected to an attack. In such embodiments, computer system 100 may implement schemes for detecting sources of the errors and/or schemes for correcting the errors, described herein.

Generating a first authentication code at external data source 200 and then comparing the first authentication code to a second authentication code generated from the sensor data stored in memory system 110, which is accessed directly by processor circuit 120, provides end to end error control for the overall framework of computer system 100 and external data source 200. Additionally, utilizing only the authentication codes to make the determination of error status and authenticity allows processor circuit 120 to process a small amount of data in the authentication codes for the determination rather than having to process an entire set of sensor data, which is a larger amount of data. Thus, generating the second authentication code for authentication of the sensor data in hardware circuit 130 provides an accelerated authentication scheme for end-to-end error control in the overall framework of computer system 100 and external data source 200.

Figure 3:
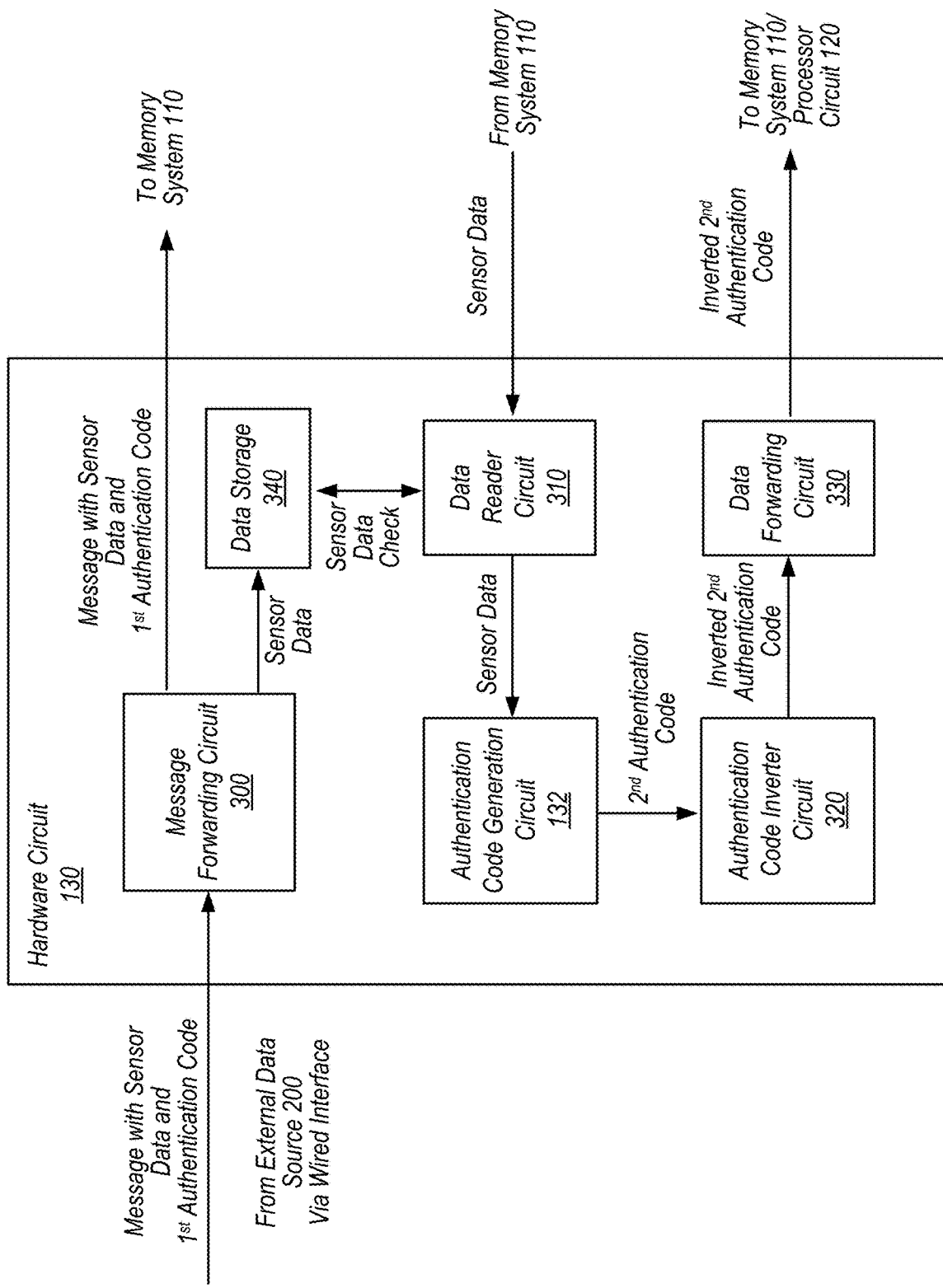
FIG. 3 is a block diagram of a hardware circuit, according to some embodiments

Hardware circuit 130 may implement various operations in processing the message received by computer system 100 and generating the second authentication code. FIG. 3 is a block diagram of hardware circuit 130, according to some embodiments. In the illustrated embodiment, hardware circuit 130 includes message forwarding circuit 300. Message forwarding circuit 300 may receive the message from external data source 200 (e.g., via a wired interface) and forwards the message to memory system 110. In certain embodiments, message forwarding circuit 300 forwards the message without any processing of the message to ensure the message stored in memory system 110 is the same message received at hardware circuit 130.

In various embodiments, hardware circuit 130 includes data reader circuit 310. Data reader circuit 310 may access (e.g., retrieve) the sensor data (along with the message identifier and/or the message counter value, if included in the message) from memory system 110. As described herein, data reader circuit 310 may not access the first authentication code from the message to allow hardware circuit 130 to generate its own authentication code (e.g., the second authentication code). In some embodiments, the interfaces between data forwarding circuit 300, data reader circuit 310, and memory system 110 are subject to ordering rules for read/write of data. For example, the ordering rules may be PCIe-type ordering rules where writes from data forwarding circuit 300 can pass reads by data reader circuit 310 but the reads cannot pass the writes. Accordingly, data reader circuit 310 may get the data written by data forwarding circuit 300 and not an older data value that might be caused by a delay in the write path.

Data reader circuit 310 may provide the sensor data to authentication code generation circuit 132, which generates the second authentication code, as described above. In some embodiments, the second authentication code is provided to authentication code inverter circuit 320 in hardware circuit 130. Authentication code inverter circuit 320 may invert the second authentication code once the code is complete (e.g., the full authentication code is generated by authentication code generation circuit 132). Inversion of the second authentication code may ensure that the second authentication code is different in at least one aspect from the first authentication code in order for processor circuit 120 to differentiate the authentication codes. Inverting the second authentication code may also ensure that there are not any stuck bit faults in the second authentication code.

Figure 4:
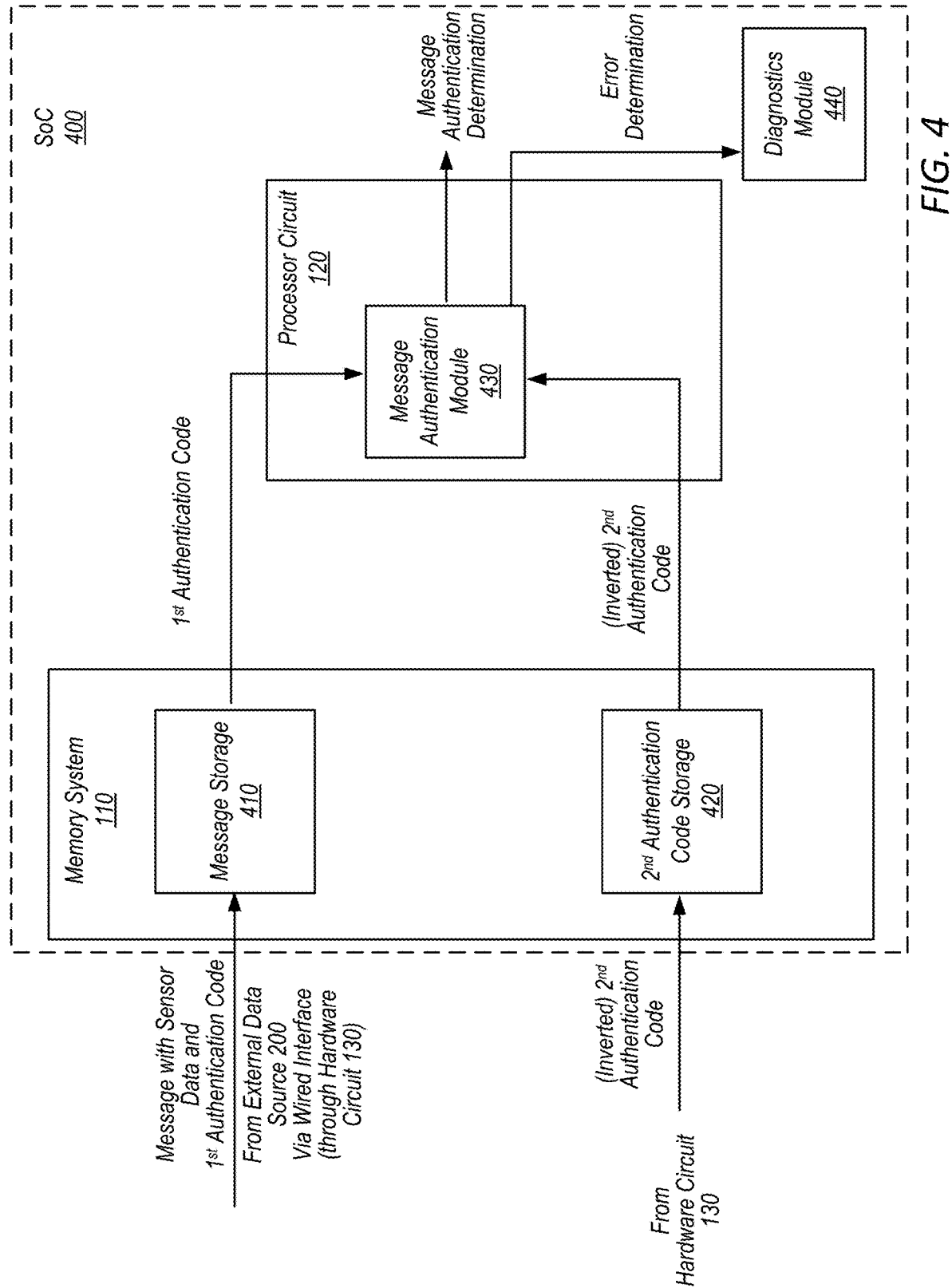
FIG. 4 is a block diagram of an SoC, according to some embodiments.

The inverted second authentication code may be provided to data forwarding circuit 330. In certain embodiments, data forwarding circuit 330 provides the inverted second authentication code to memory system 110 for storage before being accessed by processor circuit 120, as shown in FIG. 4, described below. In some embodiments, data forwarding circuit 330 may provide the inverted second authentication code directly to processor circuit 120.

FIG. 4 is a block diagram of memory system 110 and processor circuit 120, according to some embodiments. As described above, memory system 110 and processor circuit 120 may be located on the same chip (e.g., SoC 400). In illustrated embodiment memory system 110 includes message storage 410 and second authentication code storage 420. Message storage 410 may store the message with sensor data and the first authentication code for access by processor circuit 120. Second authentication code storage 420 may store the second authentication code (which may be inverted in some embodiments) for access by processor circuit 120. In various embodiments, message storage 410 and second authentication code storage 420 may be separate portions of memory in memory system 110. For example, message storage 410 and second authentication code storage 420 may be separate DRAM portions in memory system 110.

As shown in FIG. 4, processor circuit 120 includes message authentication module 430. In the illustrated embodiment, message authentication module 430 accesses the first authentication code from message storage 410 and the second authentication code (which may be inverted) from second authentication code storage 420. In various embodiments, message authentication module 430 determines whether the message with the first authentication code is authentic based on a comparison of the first authentication code to the second authentication code. For example, as described above, message authentication module 430 may determine that the message is authentic when the first authentication code and the second authentication code are identical (e.g., match) and determine that the message is inauthentic (e.g., has an error or is not from an authorized source) when the first authentication code and the second authentication code are not identical (e.g., do not match).

In embodiments where the second authentication code is inverted, message authentication module 430 may be aware of the inversion and take the inversion into consideration in determining the authenticity of the message. In some embodiments, message authentication module 430 may additionally make determinations of the authenticity of the message based on the message identifier and/or the message counter value. For example, message authentication module 430 may access the message identifier and/or the message counter value from message storage 410 and determine whether the message identifier is authentic and/or the message counter value is correct, as described above.

In some embodiments, as described above, message authentication module 430 makes a determination that the message is not authentic (e.g., an error is detected). For example, the message may be determined to have a detected error when any of the following conditions are met:

The message identifier is incorrect as determined by message authentication module 430.

The message counter value is incorrect as determined by message authentication module 430.

The first authentication code and the second authentication code do not match as determined by message authentication module 430.

In various embodiments, error determinations made by message authentication module 430 may be provided to diagnostics module 440. In some instances, a message error may be caused by a failure of the sensor (e.g., external data source 200), a failure of the interface between the sensor and computer system 100, a failure of an interface within the computer system (e.g., an interface between processor circuit 120 and hardware circuit 130), or an attack on the system by a malicious party (e.g., the malicious party is attempting to send counterfeited or falsified data to the system). In such instances, more than one message is likely to be affected and error counts of the messages may be accumulated and stored. An error rate may be determined by diagnostics module 440 based on the accumulated error counts and if the error rate is above a threshold (e.g., too high), external data source 200 (e.g., the sensor) may be determined to be non-functional and the data is ignored until corrective action is taken. Ignoring the subsequent data from external data source 200 may inhibit undesired outcomes such as a malicious party being successful at attacking computer system 100.

When the error rate determined by diagnostics module 440 is above a threshold (which may or may not be the same threshold described above), it may be an indication that there is a high bit error rate somewhere in the message transmission path causing the messages to be discarded. In such instances, embodiments may be contemplated where the sensor data (e.g., the message) is broken into one or more sections. For example, a message may have a first section, a second section, a third section, etc. with each successive section following the previous section. Breaking the message into sections may be implemented at external data source 200, which may provide separate authentication codes, message identifiers, and/or message counter values for each section. Message authentication may then independently proceed on each section of the message. Accordingly, when an error occurs in a section of the message, only the section with the error is discarded (e.g., only part of the sensor data is discarded). Breaking messages into sections may be useful in situations where messages sent by external data source 200 are long in length, which may be more susceptible to errors in communication of the messages.

Turning back to FIG. 3, in some embodiments, hardware circuit 130 may include data storage 340. Data storage 340 may receive and store the sensor data received in the message by message forwarding circuit 300. The sensor data stored in data storage 340 may be used as a check against the data received from memory system 110 by data reader circuit 310. For example, either data reader circuit 310 or data storage 340 (or a data checking circuit, not shown) may compare the sensor data received from memory system 110 against the sensor data stored in data storage 340. The sensor data stored in data storage 340 should match the sensor data received from memory system 110 if there are no faults in the interface between hardware circuit 130 and the memory system. If the sensor data stored in data storage 340 does not match the sensor data received from memory system 110, then there is an indication that there is a fault in the interface between hardware circuit 130 and the memory system.

In some embodiments, when the sensor data stored in data storage 340 does not match the sensor data received from memory system 110, hardware circuit 130 may resend the sensor data stored in data storage 340 (e.g., by message forwarding circuit 300) to memory system 110 and then retrieve the sensor data once again from the memory system. If there is still no match between the sensor data, then action may be taken to diagnose or repair the interface between hardware circuit 130 and memory system 110. If there is a match between the sensor data after rewriting the data to memory system 110, then the message checking process and further processing may proceed forward.

In some embodiments, tracking of the sensor data checking between the sensor data stored in data storage 340 and the sensor data received in data reader circuit 310 may provide reduced overall error rates for transmission of the message from external data source 200 to computer system 100. For example, depending on an error rate and cause of error in the interface between hardware circuit 130 and memory system 110, successfully rewriting errors, as described above, may help to reduce the overall error rates for transmission of the message from external data source 200 to computer system 100 if the errors are more proportionately occurring in the interface between hardware circuit 130 and memory system 110 than in the interface between computer system 100 and external data source 200.

Example Method

FIG. 5 is a flow diagram illustrating a method for authenticating a message, according to some embodiments. Method 500 may be implemented using any of the embodiments of a sensor circuit as disclosed herein, in conjunction with any circuitry or other mechanism to solve for voltage and temperature based on respective ring oscillator frequencies.

At 502, in the illustrated embodiment, a computer system receives a message from a source external to the computer system, the message having data and a first message authentication code, where the first message authentication code is generated at the external source from the data.

At 504, in the illustrated embodiment, the message is stored in a memory system of the computer system.

At 506, in the illustrated embodiment, the data in the message is retrieved from the memory system by a hardware circuit in the computer system.

At 508, in the illustrated embodiment, the hardware circuit generates a second message authentication code from the data in the message retrieved from the memory system.

At 510, in the illustrated embodiment, the hardware circuit transmits the second message authentication code to a processor circuit in the computer system.

At 512, in the illustrated embodiment, the processor circuit determines whether or not the message is authentic and whether or not there is an error in the data based on a comparison of the second message authentication code to the first message authentication code.

Example Computer System

Figure 6:
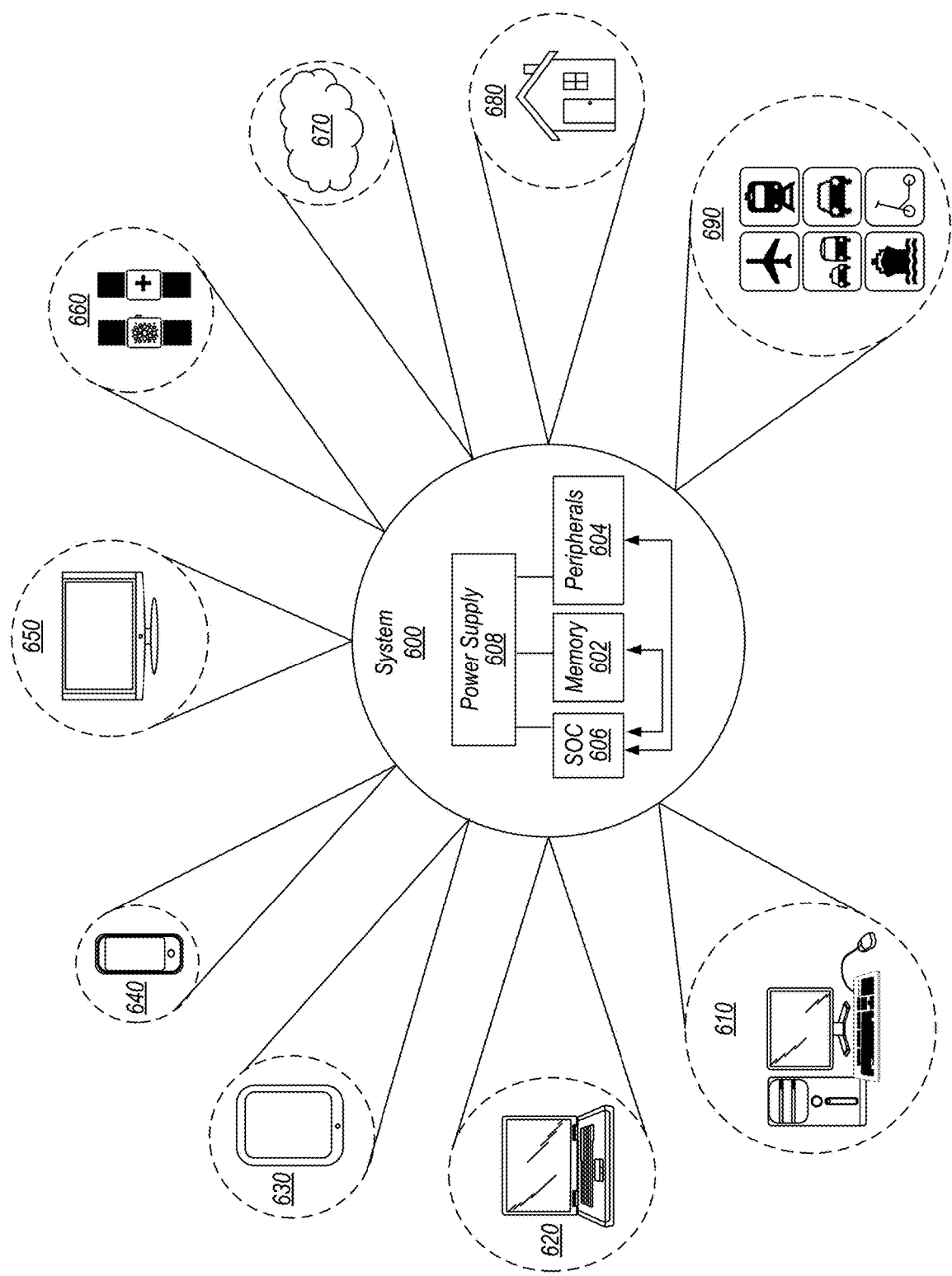
FIG. 6 is a block diagram of one embodiment of a system.

Turning next to FIG. 6, a block diagram of one embodiment of a system 600 is shown that may incorporate and/or otherwise utilize the methods and mechanisms described herein. In the illustrated embodiment, the system 600 includes at least one instance of a system on chip (SoC) 606 which may include multiple types of processing units, such as a central processing unit (CPU), a graphics processing unit (GPU), or otherwise, a communication fabric, and interfaces to memories and input/output devices. In various embodiments, SoC 606 is coupled to external memory 602, peripherals 604, and power supply 608.

A power supply 608 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer, or another device). In some embodiments, more than one instance of SoC 606 is included (and more than one external memory 602 is included as well).

The memory 602 is any type of memory, such as dynamic random access memory (DRAM), synchronous DRAM (SDRAM), double data rate (DDR, DDR2, DDR3, etc.), SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance, general systems control, and otherwise. These any many other embodiments are possible and are contemplated. It is noted that the devices and applications illustrated in FIG. 6 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:
    receiving, at a computer system, a message having sensor data and a first message authentication code, wherein the first message authentication code is generated at a source generating the sensor data;
    storing the message in a memory system of the computer system;
    retrieving, by processing circuitry in the computer system, the sensor data in the message from the memory system;
    generating, at the processing circuitry, a second message authentication code from the sensor data in the message retrieved from the memory system, wherein the second message authentication code is generated without knowledge of the first message authentication code;
    inverting, at the processing circuitry, the second message authentication code;
    transmitting, by the processing circuitry, the inverted second message authentication code to at least one processor circuit in the computer system; and
    determining, at the at least one processor circuit in the computer system, an authenticity of the message and an error status of the sensor data based on a comparison of the second message authentication code to the first message authentication code that takes into account the inversion of the second message authentication code.

2. The method as recited in claim 1 wherein the at least one processor circuit in the computer system determines the message is authentic when the comparison of the second message authentication code to the first message authentication code, taking into account the inversion, indicates that the second message authentication code and the first message authentication code match.

3. The method as recited in claim 1 wherein the at least one processor circuit in the computer system determines the message is not authentic when the comparison of the second message authentication code to the first message authentication code, taking into account the inversion, indicates a difference between the second message authentication code and the first message authentication code.

4. The method as recited in claim 1 wherein the message is received, at the computer system, from optical sensing circuitry.

5. The method as recited in claim 1 wherein the message is received, at the computer system, from a wearable device implemented for augmented reality.

6. The method as recited in claim 1 wherein the message includes a message identifier and a message counter in addition to the data, and wherein the first message authentication code is generated from the data, the message identifier, and the message counter.

7. The method as recited in claim 1 wherein the determination, at the at least one processor circuit in the computer system, includes differentiating the second message authentication code from the first message authentication code based on the inversion of the second message authentication code.

8. The method as recited in claim 1 further comprising removing the data from the memory system in response to determining that the message is not authentic or there is an error in the data.

9. A system comprising:
    a computer processor circuit, wherein the computer processor circuit is configured to receive a message from a source generating sensor data, the message having the sensor data and a first message authentication code, wherein the first message authentication code is generated at the source from the sensor data;
    a memory system configured to store the message received by the computer processor circuit; and
    functional circuitry configured to retrieve the message from the memory system, generate a second message authentication code from the sensor data in the message retrieved from the memory system without knowledge of the first message authentication code, invert the second message authentication code, and transmit the inverted second message authentication code to the computer processor circuit;
    wherein the computer processor circuit is configured to determine an authenticity of the message and an error status of the sensor data based on a comparison of the second message authentication code to the first message authentication code that takes into account the inversion of the second message authentication code.

10. The system as recited in claim 9 wherein the computer processor circuit is configured to receive the message from the source over a wired interface between the computer processor circuit and the source.

11. The system as recited in claim 9 wherein the computer processor circuit is configured to ignore the data in the message in response to a determination that the message is not authentic or there is an error in the data.

12. The system as recited in claim 9 wherein the message is received, at the computer processor circuit, as a stream of data, and wherein the functional circuitry is configured to retrieve the message from the memory system as the stream of data is being stored in the memory system.

13. The system as recited in claim 9 wherein the functional circuitry is configured to receive the message from the source and transmit the message without processing of the message.

14. The system as recited in claim 9 wherein the memory system comprises a dynamic memory system.

15. A method comprising:
    receiving, at functional circuitry in a computer system, a message from sensing circuitry, the message having sensor data, a message counter, and a first message authentication code, wherein the first message authentication code is generated by the sensing circuitry from the sensor data and the message counter;
    transmitting, by the functional circuitry, the message to at least one processor circuit in the computer system;
    storing, by the at least one processor circuit, the message in a memory system of the computer system;
    retrieving, by the functional circuitry, the sensor data and the message counter from the memory system;
    generating, at the functional circuitry, a second message authentication code from the sensor data and the message counter retrieved from the memory system, wherein the second message authentication code is generated without knowledge of the first message authentication code;

inverting, at the functional circuitry, the second message authentication code;

transmitting, by the functional circuitry, the inverted second message authentication code to the at least one processor circuit; and determining, at the at least one processor circuit, an authenticity of the message and an error status of the sensor data based on a comparison of the second message authentication code to the first message authentication code that takes into account the inversion of the second message authentication code.

16. The method as recited in claim 15 wherein the sensing circuitry includes optical sensing circuitry.

17. The method as recited in claim 15 wherein the message is received, at the functional circuitry, from a wearable device implemented for augmented reality.

18. The method as recited in claim 15 further comprising determining, at the at least one processor circuit, a uniqueness of the message based on the message counter.

19. The method as recited in claim 15 further comprising:

storing the sensor data at the functional circuitry as received sensor data when the message is received from the sensing circuitry; and comparing, at the functional circuitry, the sensor data in the message retrieved from the memory system to the received sensor data to determine whether or not the sensor data retrieved from the memory system is identical to the received sensor data.

20. The method as recited in claim 15 further comprising:

receiving, at the functional circuitry, a plurality of messages from the sensing circuitry;

determining, for each message at the at least one processor circuit, an authenticity of the message and an error status of the sensor data; and determining, at the at least one processor circuit, an error rate for the plurality of messages based on said determinations the authenticity of the message and the error status of the sensor data for each message.

* * * * *